US008873801B2

(12) United States Patent
Wang

(10) Patent No.: US 8,873,801 B2
(45) Date of Patent: Oct. 28, 2014

(54) IDENTIFICATION OF OBJECTS IN A VIDEO

(75) Inventor: Zhanjie Wang, Dalian (CN)

(73) Assignee: Empire Technology Development LLC, Wilmington, DE (US)

( * ) Notice: Subject to any disclaimer, the term of this patent is extended or adjusted under 35 U.S.C. 154(b) by 368 days.

(21) Appl. No.: 13/380,819

(22) PCT Filed: Aug. 3, 2010

(86) PCT No.: PCT/CN2010/075660
§ 371 (c)(1),
(2), (4) Date: Dec. 24, 2011

(87) PCT Pub. No.: WO2012/016374
PCT Pub. Date: Feb. 9, 2012

(65) Prior Publication Data
US 2012/0106797 A1    May 3, 2012

(51) Int. Cl.
*G06K 9/00* (2006.01)
*H04N 7/18* (2006.01)
*G06T 7/20* (2006.01)
*G06K 9/62* (2006.01)

(52) U.S. Cl.
CPC ............... *H04N 7/18* (2013.01); *G06T 7/2053* (2013.01); *G06K 9/00771* (2013.01); *G06K 9/6215* (2013.01); *G06T 2207/10016* (2013.01); *G06T 2207/20021* (2013.01); *G06T 2207/20144* (2013.01); *G06T 2207/30232* (2013.01); *G06T 2207/30236* (2013.01)
USPC ........... 382/103; 382/105; 382/165; 382/167; 382/254; 382/266; 382/274

(58) Field of Classification Search
None
See application file for complete search history.

(56) References Cited

U.S. PATENT DOCUMENTS

| 6,263,091 B1* | 7/2001 | Jain et al. ....................... 382/125 |
| 6,532,301 B1* | 3/2003 | Krumm et al. ................ 382/170 |
| 6,611,622 B1* | 8/2003 | Krumm .......................... 382/170 |
| 6,614,847 B1* | 9/2003 | Das et al. ................. 375/240.16 |
| 6,801,662 B1* | 10/2004 | Owechko et al. ............. 382/224 |
| 6,901,170 B1* | 5/2005 | Terada et al. ................. 382/260 |

(Continued)

FOREIGN PATENT DOCUMENTS

| CN | 1801930 A | 7/2006 |
| CN | 101447082 A | 6/2009 |
| WO | WO 2004085718 A1 * | 10/2004 .............. C30B 29/32 |

OTHER PUBLICATIONS

Hu Guoliang, Vehicle Detection Tracking and Classification Technology Research Based on the video, 15, Jul. 2009, Masters Thesis, Univ. of Dalian University of Technology. With English Abstract.*

(Continued)

*Primary Examiner* — Chan Park
*Assistant Examiner* — Iman K Kholdebarin
(74) *Attorney, Agent, or Firm* — Ren-Sheng International

(57) ABSTRACT

Techniques related to identifying objects in a video are generally described. One example method for identifying a moving object in a video may include generating a background frame and a foreground frame based on the video, comparing the foreground and the background frames at each corresponding location, acquiring an object area based on the comparison, determining if object area contains a moving object based on size and shape of the object area, identifying the moving object against templates of target objects, and updating the background frame according to the comparison.

15 Claims, 5 Drawing Sheets

(56) References Cited

U.S. PATENT DOCUMENTS

| | | | | |
|---|---|---|---|---|
| 6,952,496 | B2* | 10/2005 | Krumm | 382/170 |
| 7,062,093 | B2* | 6/2006 | Steger | 382/216 |
| 7,418,113 | B2* | 8/2008 | Porikli et al. | 382/103 |
| 7,519,197 | B2* | 4/2009 | Shan et al. | 382/103 |
| 7,620,204 | B2* | 11/2009 | Porikli et al. | 382/103 |
| 7,627,171 | B2* | 12/2009 | Hampshire et al. | 382/173 |
| 8,159,536 | B2* | 4/2012 | Wang et al. | 348/152 |
| 8,515,890 | B2* | 8/2013 | Zadeh | 706/45 |
| 8,565,525 | B2* | 10/2013 | Rossato et al. | 382/173 |
| 8,611,593 | B2* | 12/2013 | Chen et al. | 382/103 |
| 2005/0163345 | A1* | 7/2005 | van den Bergen et al. | 382/103 |
| 2006/0018516 | A1* | 1/2006 | Masoud et al. | 382/115 |
| 2006/0262960 | A1* | 11/2006 | Le Clerc et al. | 382/103 |
| 2007/0115357 | A1* | 5/2007 | Stein et al. | 348/148 |
| 2007/0273765 | A1* | 11/2007 | Wang et al. | 348/152 |
| 2008/0219573 | A1* | 9/2008 | Lu | 382/236 |
| 2008/0252723 | A1* | 10/2008 | Park | 348/143 |
| 2008/0273751 | A1* | 11/2008 | Yuan et al. | 382/103 |
| 2009/0096790 | A1* | 4/2009 | Wiedemann et al. | 345/427 |
| 2009/0116749 | A1* | 5/2009 | Cristinacce et al. | 382/195 |
| 2010/0046799 | A1* | 2/2010 | Saptharishi et al. | 382/103 |
| 2010/0208986 | A1* | 8/2010 | Cobb et al. | 382/165 |
| 2011/0280478 | A1* | 11/2011 | Chen et al. | 382/165 |
| 2012/0106797 | A1* | 5/2012 | Wang | 382/103 |
| 2012/0278812 | A1* | 11/2012 | Wang | 718/104 |

OTHER PUBLICATIONS

Ahmed Elgammal, Background and Fireground modeling Using nonparametric Kernel Density Estimation, 2002, Proceedings of the IEEE vol. 90, No. 7, Jul. 2002.*

PCT Search report dated May 12, 2011, by PCT/CN2010/075660. Provdied by applicant (p. 1-12).*

Guoliang Hu, Vehicle Detection and Tracking Classification Technology Research Based on the Video, Sep. 22, 2009, Masters Thesis.*

Notification of Transmittal of the International Search Report and the Written Opinion of the International Searching Authority, May 12, 2011.

Hu, Guoliang, "Vehicle Detection and Tracking Classification Technology Research Based on the Video", Chinese Master's Theses Full-text Database Information Science and Technology, Jul. 15, 2010, No. 7, pp. 1-51, ISSN 1674-0246, p. 13, section 3-p. 41, section 6, figures 4.2, 5.1, 6.1(a)-(c).

* cited by examiner

160 A computer program product

162 A signal bearing medium 164 at least one of one or more instructions for
    generating a background frame by extracting a first frame from the video;
    generating a foreground frame by extracting a second frame from the video;
    comparing the foreground frame with the background frame at each corresponding location;
    acquiring an object area including corresponding locations each having a difference greater than a predetermined threshold;
    determining, using a programmed processor, whether the object area contains a moving object based on one or more of a size and a shape of the object area;
    when the object area contains a moving object, identifying, using the programmed processor, the moving object;
    updating, using the programmed processor, the background frame according to the difference between the background and the foreground frames at each corresponding location;
    generating an other foreground frame by extracting a third frame from the video; and/or
    repeating comparing, acquiring, and determining from the updated background frame and the other foreground frame.

166 a communication medium 168 a non-transitory computer readable medium 170 a recordable medium

FIG. 4

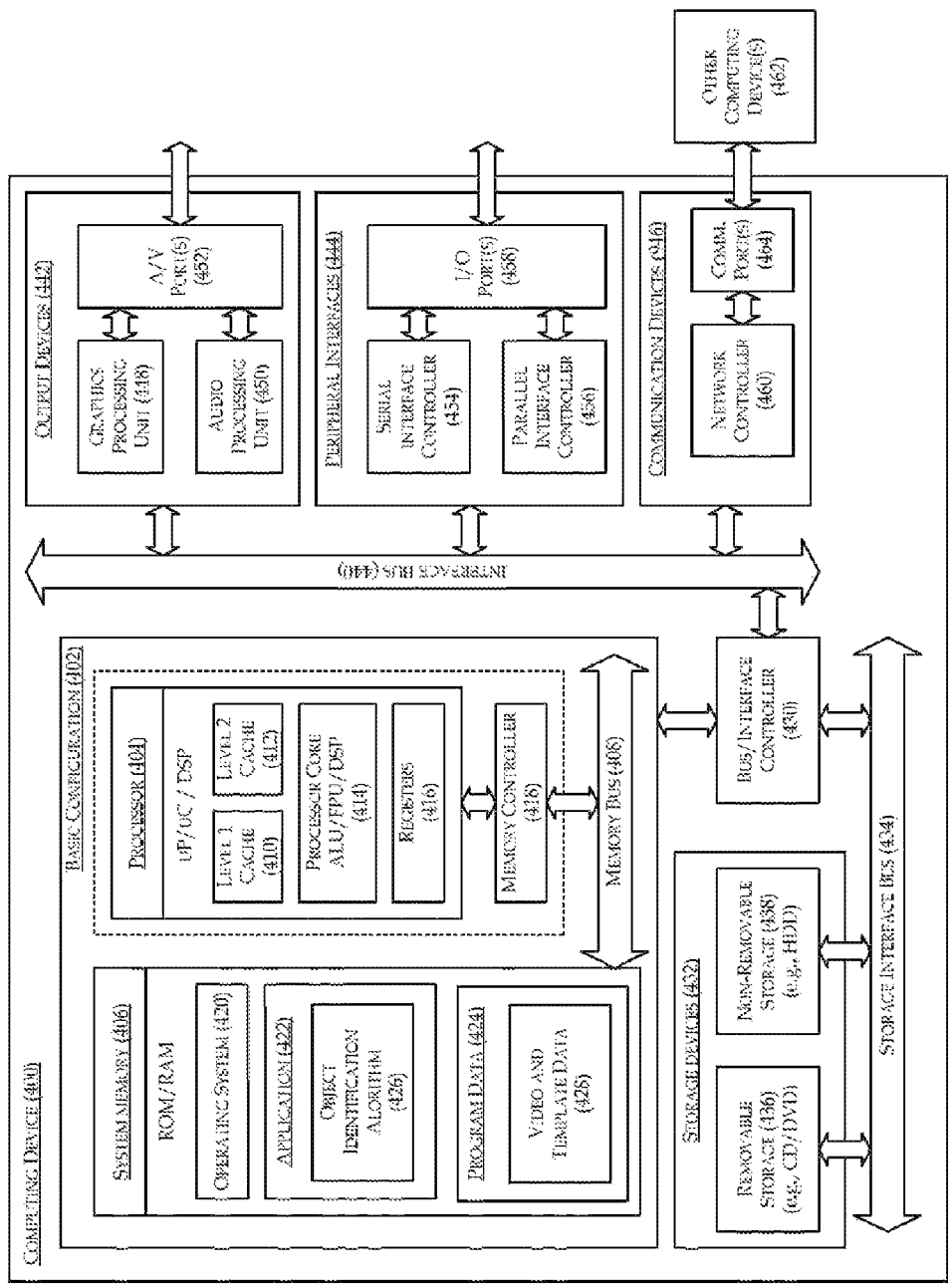

IDENTIFICATION OF OBJECTS IN A VIDEO

CROSS-REFERENCE TO RELATED APPLICATION

The present application is a 371 application of the International Application PCT/CN2010/075660, filed on Aug. 3, 2010 and entitled "IDENTIFICATION OF OBJECTS IN A VIDEO." The disclosure of the forgoing application is hereby incorporated by reference in its entirety, including any appendices or attachments thereof, for all purposes.

BACKGROUND

The need for effective security and surveillance is ever increasing. Video surveillance systems typically utilize one or more sensors, such as closed circuit television (CCTV) and infrared cameras, radars, etc., placed at various locations about an area of interest. Effective surveillance of the area requires fast and accurate identification of objects in the video captured by such systems.

SUMMARY

In at least some embodiments of the present disclosure, a method for identifying a moving object in a video includes generating a background frame and a foreground based on the video, comparing the foreground and the background frames at each corresponding location, acquiring an object area based on the comparison, determining if the object area contains a moving object based on size and shape of the object area, identifying the moving object against templates of target objects, and updating the background frame according to the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a block diagram of an illustrative embodiment of a computer program product for implementing a method for identifying a moving object in a video.

FIG. 5 is a block diagram of an illustrative embodiment of a computing device suitable for implementing a method for identifying a moving object in a video.

DETAILED DESCRIPTION

Figure 1:
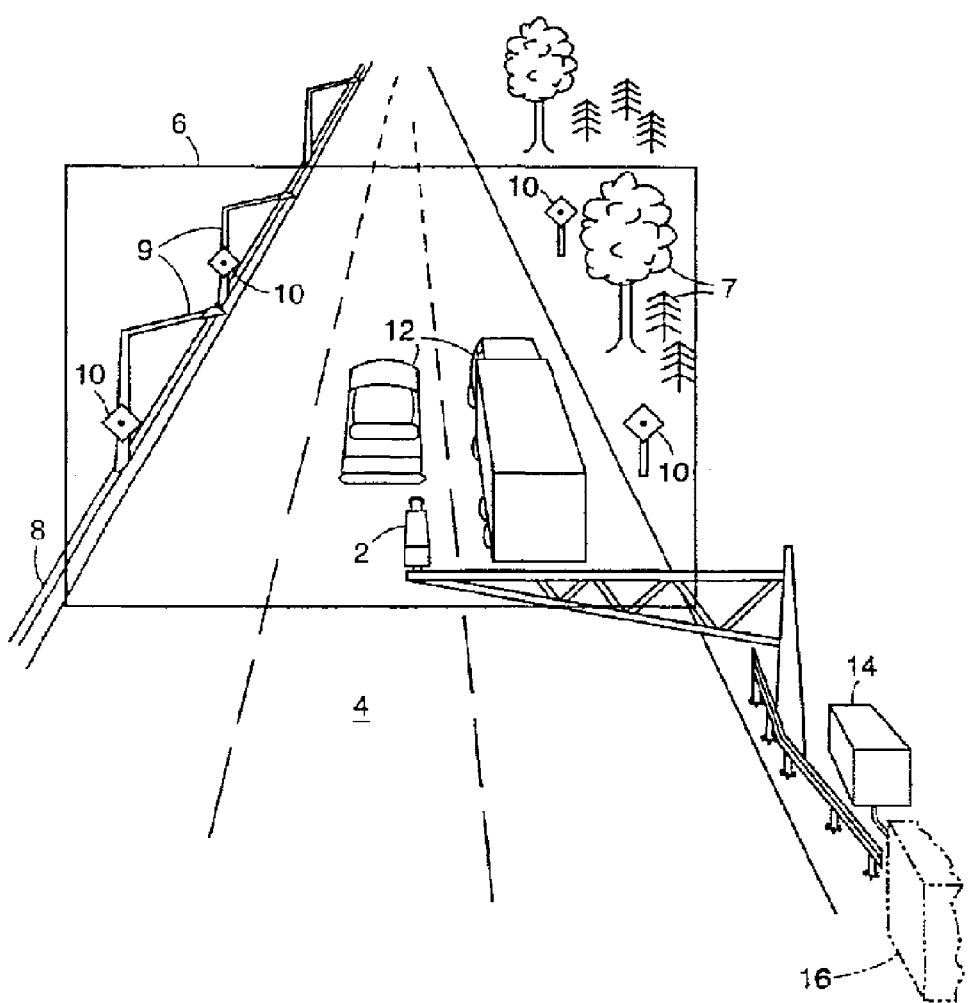
FIG. 1 is a diagram of an illustrative embodiment of a system for identifying a moving object in a video.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to techniques, systems, and methods for identifying a moving object in a video.

FIG. 1 is a diagram of an illustrative embodiment of a system for identifying a moving object in a video. As depicted, a video camera 2 is positioned above a roadway 4 to capture a scene 6. Scene 6 includes various stationary objects such as trees 7, a barrier 8, light poles 9, and position markers 10. Scene 6 may also contain moving objects such as vehicles 12. Video camera 2 outputs a streaming video to a computer system 16. When computer system 16 is remotely located (i.e., computer system 16 is located away from video camera 2), local telecom equipment 14 may relay the video from video camera 2 to computer system 16. The video may be in any standard digital format.

Figure 2:
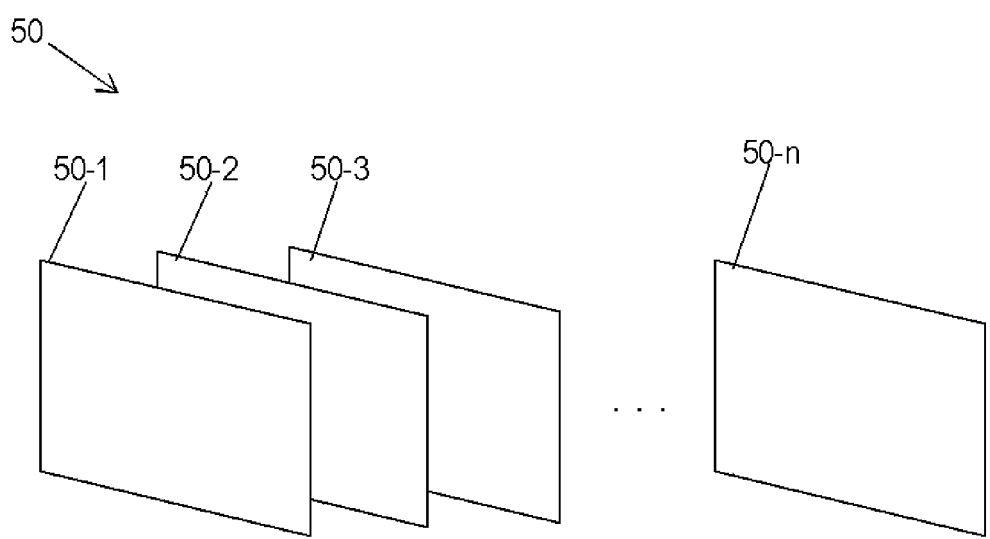
FIG. 2 is a diagram of an example sequence of frames.

Computer system 16 identifies a moving object in the video in real time or from playback of the video in storage. FIG. 2 is a diagram of an example sequence of frames 50. Frames 50 may be suitable for processing by computer system 16. As depicted, frames 50 includes frames 50-1, 50-2, 50-3, ..., and 50-n. Computer system 16 initially selects a frame, such as frame 50-1, and sets the selected frame as a background frame. Computer system 16 then selects a following frame in frames 50, such as frame 50-2, and sets the selected frame as a foreground frame for comparison with the background frame to identify any moving object in the foreground frame. Computer system 16 updates the background frame based on the comparison of the background and the foreground frames. Computer system 16 then repeats the process by selecting a following frame in frames 50, such as frame 50-3, and sets the selected frame as the new foreground frame.

Figure 3:
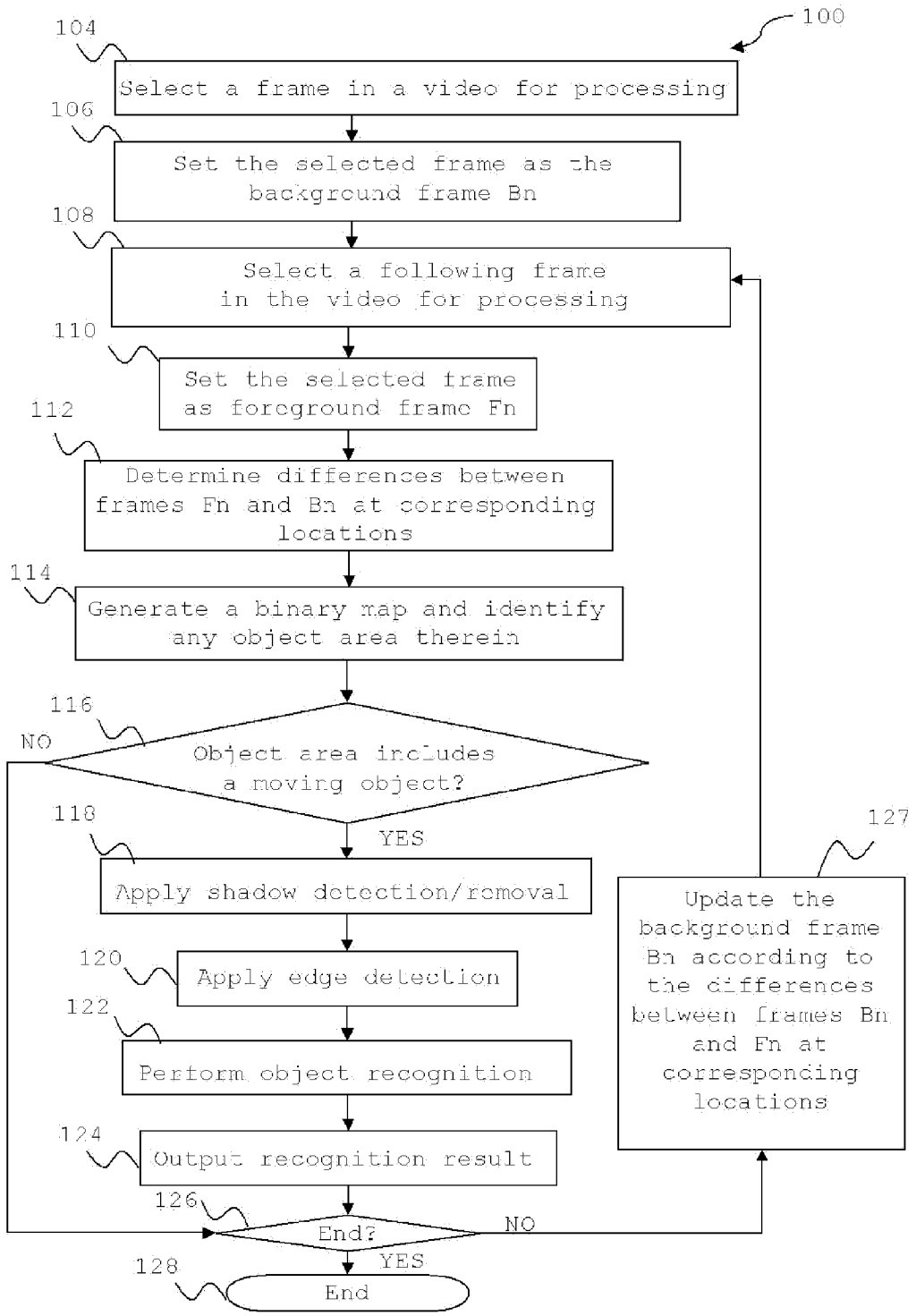
FIG. 3 is a flowchart of an illustrative embodiment of a method for identifying a moving object in a video.

FIG. 3 is a flowchart of an illustrative embodiment of a method 100 for identifying a moving object in a video. Method 100 may include one or more operations, functions or actions as illustrated by one or more of blocks 104, 106, 108, 110, 112, 114, 116, 118, 120, 122, 124, 126, 127, and/or 128. The various blocks may be combined into fewer blocks, divided into additional blocks, and/or eliminated based upon the desired implementation. Depending on the desired configuration, method 100 may be performed by computer system 16.

Method 100 processes each frame in the video when the frame frequency is 30 frames per second or less. When the frame rate is greater than 30 frames per second, some frames are skipped based on a treatment frequency determined using Shannon's law.

Processing for method 100 may begin at block 104, "Select a frame in a video for processing." Block 104 may be followed by block 106, "Set the selected frame as the background frame Bn." Block 106 may be followed by block 108, "Select a following frame in the video for processing." Block 108 may be followed by block 110, "Set the selected frame as foreground frame $F_n$."

Block 110 may be followed by block 112, "Determine differences between frames $F_n$ and $B_n$ at corresponding locations." Block 112 may be followed by block 114, "Generate a binary map and identify any object area therein." Block 114 may be followed by decision block 116, "Object area includes a moving object?". If the object area includes a moving object, decision block 116 may be followed by block 118, "Apply shadow detection/removal." If the object area does not include a moving object, decision block 116 may be followed by decision block 126, "End?"

Block 118 may be followed by block 120, "Apply edge detection." Block 120 may be followed by block 122, "Perform object recognition." Block 122 may be followed by block 124, "Output recognition result." Block 124 may be followed by decision bock 126, "End?". If method 100 is to end, decision block 126 may proceed to end block 128. If method 100 is to continue, decision block 126 may be followed by block 127, "Update the background frame $B_n$ according to the differences between frames $B_n$ and $F_n$ at corresponding locations," which may then return to block 108. Details of the blocks are described hereafter.

At block 104, computer system 16 selects a frame in the video for processing. At block 106, computer system 16 sets the selected frame as the background frame $B_n$. At block 108, computer system 16 selects a following frame in the video for processing. At block 110, computer system 16 sets the selected frame as the foreground frame $F_n$. At blocks 112, 114 and 116, the background frame $B_n$ is used as a reference for identifying moving objects in the foreground frame F.

In an illustrative embodiment of the processing of block 112, computer system 16 converts the foreground frame $F_n$ and the background frame $B_n$ into grayscale images (a foreground image and a background image, respectively) in which each pixel has a grayscale value ranging between 0 and 255. The grayscale value of the foreground image at a pixel location (x, y) is represented by $F_n$ (x, y), while the grayscale value of the background image at the pixel location (x, y) is represented by $B_n$(x, y). Computer system 16 then determines the pixel-to-pixel difference between the foreground frame $F_n$ and the background frame $B_n$ at each corresponding pixel location.

In another illustrative embodiment of the processing of block 112, computer system 16 divides the foreground frame $F_n$ and the background frame $B_n$ into corresponding blocks (e.g., blocks of 4×4 or 8×8 pixels). Computer system 16 then determines the block-to-block difference between the foreground frame $F_n$ and the background frame $B_n$ at each corresponding block location. Computer system 16 uses the average grayscale values of the pixels in the blocks for comparison instead of using the grayscale value of each single pixel, thereby shortening computing time.

At block 114, computer system 16 generates a binary map $D_n(x,y)$ based on the result of block 112. For example, computer system 16 sets a bit in the binary map $D_n(x,y)$ to 1 when the difference between the foreground frame $F_n$ and the background frame $B_n$ at a corresponding pixel or block location exceeds a threshold, and the computer system sets the bit to 0 otherwise. In other words, an area of the foreground frame $F_n$ that corresponds to an area of the binary map marked with bit "1" is determined to be an area that possibly includes a moving object (i.e., an object area), and an area of the foreground frame that corresponds to an area of the binary map marked with bit "0" in the binary map is determined to be the background (i.e., a background area). In one or more embodiments of the present disclosure, computer system 16 may apply noise-filtering or edge-smoothing to the binary map in order to improve accuracy in object identification.

In one or more embodiments of the present disclosure, the threshold for generating binary map $D_n(x,y)$ may be determined using one of two ways. A first way may be used when a majority of the images is generally observed to be static background. The first way determines the threshold based on the histogram of the differences between the foreground frame $F_n$ and the background frame $B_n$ as follows:

$$S_n(x,y)=|F_n(x,y)-B_n(x,y)|,$$

$$MED=\text{median}[S_n(x,y)]; \forall(x,y)\epsilon F_n,$$

$$MAD=\text{median}[S_n(x,y)-MED]; \forall(x,y)\epsilon F_n,$$

$$TH=MED+3*\lambda*MAD,$$

where TH is the threshold, and $\lambda$ is the value of the normal distribution of the normalized factor, which is equal to 1.482. A second way may be used when less than a majority of the images is not observed to be static background. In the second way, the mean gray value of the current frame is used as the threshold.

In decision block 116, computer system 16 determines if the object area includes a moving object based on the size and/or the shape of the object area. Thresholds for the size and the shape of the object area depend on the particular application, such as the size of scene 6 captured by camera 2 relative to the size of vehicles 12. If computer system 16 determines the object area includes a moving object, decision block 116 may be followed by object recognition at blocks 118, 120, 122, and 124 before determining if method 100 should continue in decision block 126. Otherwise decision block 116 may be followed by decision block 126.

At block 118, computer system 16 applies shadow detection and removal to the object area in order to improve the accuracy of subsequent object recognition. Since shadows impact image brightness, some conventional methods detect and remove shadows based on the relationship between the grayscale values of the foreground frame and the background frame. However, shadow free pixels may be mistakenly removed if the grayscale value is the only criterion. Therefore, computer system 16 performs shadow detection and removal based on the relationship between the grayscale values of the foreground frame and the background frame, as well as the relationship between the vectors representing the foreground frame and the background frame in a certain color space.

In some embodiments, a shadow region Shadow(x,y) is determined in the HSV (hue, saturation and value) color space. The shadow region Shadow(x,y) may be defined as follows:

$$\text{Shadow}(x, y) = \begin{cases} 1, & \text{when } A \leq \frac{F_V(x, y)}{B_V(x, y)} \leq B \text{ and } C \leq \frac{F_n(x, y)}{B_n(x, y)} \leq B, \\ 0, & \text{elsewhere,} \end{cases}$$

wherein
   $B_V(x,y)$ is a value component representing the background frame at a corresponding pixel location (x,y) according to HSV color space;
   $F_V(x,y)$ is a value component representing the foreground frame at the corresponding pixel location (x,y) according to HSV color space; and
   A, B, C, D are predetermined values ranging between 0 and 1.

In HSV color space, a shadow affects all of the hue, saturation, and value components of the image but only the value component exhibits regularity in its behavior. Therefore, computer system 16 generates the shadow region Shadow(x, y) according to the variations in the grayscale values and the value components of the foreground frame and the background frame, thereby increasing the accuracy in shadow detection. Shadow removal may be performed by removing a shadow pixel from the object area at a bit location (x,y) where Shadow(x,y)=1. The values of A, B, C and D may vary according to application. In one or more embodiments of the present disclosure, A=0.5, B=0.6, C=0.8 and D=1.5 may be adopted based on experimental results.

At block 120, computer system 16 performs edge detection to obtain an edge map of the object area and determines a length to width ratio of the object area in terms of pixel number. Computer system 16 may perform edge detection using an edge detector such as Canny edge detector, Roberts edge detector, Sobel edge detector, Prewitt edge detector, or other types of edge detectors.

Computer system 16 may have access to a library of templates of target objects. The library may be created before method 100 is performed. For each target object to be recognized by method 100, photos of the target object is taken at multiple angles. For example, a picture may be taken approximately every 3 degrees within approximately ±15 degrees of the front of a vehicle. The same edge detector used at block 120 may be used to obtain an edge map of each photo, and the length to width ratio of the target object in each photo is calculated. The edge map and the length/width ratio are saved as a template of the target object.

At block 122, computer system 16 performs object recognition to determine if the object area matches one of the templates of the target objects. In an illustrative embodiment, computer system 16 only compares the edge map of the object area against the templates that have similar length/width ratios (e.g., having differences less than a threshold). Computer system 16 normalizes the edge map of the object area and the selected templates so that they have the same size and shape (e.g., 100×200 pixels).

Next, computer system 16 determines the Hausdorff distance between the edge map of the object area and each selected template. If the Hausdorff distance does not exceed a predetermined distance, computer system 16 determines that the moving object in the foreground frame matches the target object of a selected template. Computer system 16 may obtain a number of target objects that match the moving object in the foreground frame. When that occurs, computer system 16 may select the target object of the template that results in the smallest Hausdorff distance as the target object that best matches the moving object in the foreground frame.

In one or more embodiments of the present disclosure, computer system 16 may overlap the normalized edge map of a selected template ("first normalized edge map") and the normalized edge map of the object area ("second normalized edge map") in various positions and determine corresponding matching scores. Computer system 16 may set the Hausdorff distance for the selected template and the object area as the minimum matching score.

For example, computer system 16 overlaps the first and the second normalized edge maps border-by-border without any offset in any direction in a first position. Computer system 16 selects M reference points on the edges in the first normalized edge map of the selected template and then, for each reference point, determines the closest target point on the edges in the second normalized edge map of the object area, or vice versa. Computer system 16 searches within circled regions centered at each reference point and having radii 1, 2, ..., R in terms of pixel number. If the closest target point to a reference point is located within a circled region centered at the reference point and having an rth radius among the R radii (the rth radius is the shortest among all other possible radii whose lengths do not exceed R), computer system 16 sets the distance value of the reference point to the value of the rth radius. Based on experimental results, radius R may be set to 1/10 to 1/20 of the border length. If no target point is located within a circled region having the radius R, computer system 16 sets the distance value of the reference point to R. The same calculation is repeated for all reference points, and M corresponding distance values is acquired. Next, the first n smallest distance values among the M distance values are summed up as the matching score E of the object area and the selected template. The value of n is defined as follows:

n=[h*p], wherein 0≤h≤1 (typically 0.6-0.8); and p is the number of pixels in the first/second normalized edge maps.

Other positions may be achieved by moving one of the first and the second normalized edge maps in a predetermined direction for a predetermined distance after positioning the first and the second normalized edge maps in the first position. For example, the first normalized edge map may be moved upwards/downwards/rightwards/leftwards with respect to the second normalized edge map from the first orientation for a predetermined number of times, and the distance of each shift may be equal to the length of one pixel. The matching scores E' after each shift are calculated in the same manner as previously described. If the matching scores E' is smaller than the matching score E, then the matching score E is set to the matching score E'. The final Hausdorff distance for the edge map of the object area and the selected template is set equal to the matching score E divided by n.

At block 124, computer system 16 outputs the recognition result of block 122 on a display. The recognition result may be used for many applications.

In one application, the present disclosure may be used to monitor and control traffic at an intersection. The recognition result identifies the amount of traffic and the types of vehicles. These information may be used to make real-time traffic guidance and control, which help to reduce congestion, traffic delays, and the probability of traffic accidents.

In one application, the present disclosure may be used for identifying moving vehicles for surveillance and investigative purposes. For example, the police may need to locate a vehicle of interest. The video received at block 102 may be obtained from surveillance cameras located throughout a region where the object of interest is likely present, such as street corners, shops, public facilities, airports, railway stations, toll bridges, tunnels and tolled booths along highways or parking lots, etc. Once an object matching the vehicle of interest has been identified, subsequent measures may be taken, such as automatically notifying the relevant authority of the current location of the identified object for issuing ticket or making an arrest.

In decision block 126, computer system 16 determines if method 100 is to end or continue. For example, method 100 may be set to run for a predetermined period of time or computer 16 may receive an external command to end method 100. If method 100 is to end, decision block 126 may be followed by end block 128, which ends method 100. If method 100 is to continue, decision block 126 may be followed by block 127.

At block 127, computer system 16 updates background frame $B_n$ as follows:

$$B_{n+1}(x, y) = \begin{cases} \alpha * B_n(x, y) + (1 - \alpha) * F_n(x, y), & \text{when } D_n(x, y) = 0 \\ B_n(x, y) + \beta, & \text{when } D_n(x, y) = 1 \end{cases}$$

wherein $F_n(x,y)$ is a pixel value in the current foreground frame at the pixel location (x,y);

$B_n(x,y)$ is a pixel value in the current background frame at the pixel location (x,y);

$B_{n+1}(x,y)$ is a pixel value in the updated background frame at the pixel location (x,y); and α and β are predetermined factors.

Factor α reflects how the background area of the current foreground frame $F_n$ influences the current background frame $B_n$, and that influence is used to generate the background area in the updated background frame $B_{n+1}$. In one or more embodiments of the present disclosure, α may be chosen between 0 and 1 based on different background environments. For example, in the background area marked by $D_n(x,y)=0$, the updated background frame $B_{n+1}$ is the average of the current foreground frame $F_n$ and the current background frame $B_n$ when factor α is 0.5. With this approach, the updated background frame $B_{n+1}$ provides a better reference for the subsequent foreground frame since it includes possible variations in the background environment.

Factor β reflects how the object area (regardless of whether it includes a moving object or not) of the current foreground frame $F_n$ influences the current background frame $B_n$, and that influence is used to generate the object area in the updated background frame $B_{n+1}$. When an object enters a current foreground frame, stops, and remains stationary for a period of time, that object becomes part of the background for subsequent foreground frames. The object may be misidentified as a moving object in each of the subsequent foreground frames in conventional methods. In the present disclosure, the corresponding background frames for these subsequent foreground frames are updated so as to include the object in the background, thereby improving the accuracy for identifying other moving objects. When an object that had remained stationary for a period of time in previous foreground frames leaves a current foreground frame, the corresponding background frame of the subsequent foreground frame may be updated so as to exclude the object from the background. Therefore, factor β may be set according to the current speed of the moving object, the frame length, or the frame period. In one or more embodiments of the present disclosure, if the value of $F_n(x,y)-B_n(x,y)$ falls in the positive range, factor β may be set to 2. If the value of $F_n(x,y)-B_n(x,y)$ falls in the negative range, factor β may be set to -2. If the value of $F_n(x,y)-B_n(x,y)$ is zero (e.g., static background), factor β may be set to zero to produce no change.

FIG. 4 is a block diagram of an illustrative embodiment of a computer program product 160 for implementing a method for identifying a moving object in a video. Computer program product 160 may include a signal bearing medium 162. Signal bearing medium 162 may include one or more sets of executable instructions 164 that, when executed by, for example, a processor, may provide the functionality described above with respect to FIGS. 1 and 3. Thus, for example, referring to computer system 16 of FIG. 1, a processor of computer system 16 may undertake one or more of the blocks shown in FIG. 3 in response to instructions 164 conveyed to computer system 16 by signal bearing medium 162.

In some implementations, signal bearing medium 164 may encompass a non-transitory computer readable medium 168, such as, but not limited to, a hard disk drive, a Compact Disc (CD), a Digital Video Disk (DVD), a digital tape, memory, etc. In some implementations, signal bearing medium 162 may encompass a recordable medium 170, such as, but not limited to, memory, read/write (R/W) CDs, R/W DVDs, etc. In some implementations, signal bearing medium 162 may encompass a communications medium 166, such as, but not limited to, a digital and/or an analog communication medium (e.g., a fiber optic cable, a waveguide, a wired communications link, a wireless communication link, etc.). Thus, for example, referring to computer system 16 of FIG. 1, computer program product 160 may be wirelessly conveyed to computer system 16 by signal bearing medium 162, where signal bearing medium 162 is conveyed to computer system 16 by a wireless communications medium 166 (e.g., a wireless communications medium conforming with the IEEE 802.11 standard). Computer program product 160 may be recorded on non-transitory computer readable medium 168 or another similar recordable medium 170.

FIG. 5 is a block diagram of an illustrative embodiment of a computing device 400 configured to implement a method for identifying a moving object in a video. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Applications 422 may include an object identification algorithm 426 that is arranged to perform method 100 of FIG. 3. Program data 424 may include video and template data 428 that may be useful for operating object identification algorithm 426 as is described in the present disclosure. In some embodiments, applications 422 may be arranged to operate with program data 424 on operating system 420 such that implementations of object identification may be provided as described in the present disclosure. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method to identify a moving object in a video, comprising:
    generating a background frame based on a first frame in the video;
    generating a foreground frame based on a second frame in the video, wherein the second frame follows the first frame in the video;
    comparing the foreground frame with the background frame at each corresponding location;
    acquiring an object area including corresponding locations each having a difference greater than a threshold;
    determining, using a processor, whether the object area contains a moving object based on one or more of a size and a shape of the object area;
    when the object area contains a moving object, identifying, using the processor, the moving object;
    updating, using the processor, the background frame according to the difference between the background and the foreground frames at each corresponding location, wherein updating the background frame comprises, at each corresponding location, responsive to determination that the difference between the background and the foreground frames at the corresponding location exceeds the threshold, adding a predetermined factor to a pixel value of the background image;
    generating an other foreground frame based on a third frame in the video, wherein the third frame follows the second frame in the video; and
    repeating comparing, acquiring, and determining from the updated background frame and the other foreground frame.

2. The method of claim 1, further comprising:
    converting the background and the foreground frames into grayscale images prior to comparing the foreground frame with the background frame so as to acquire a difference in grayscale values between the background and the foreground frames at each corresponding location.

3. The method of claim 2, wherein updating the background frame comprises, at each corresponding location:
    when the difference between the background and the foreground frames at the corresponding location does not exceed the threshold, summing (1) a first product of a first pixel value in the background image and a first factor and (2) a second product of a second pixel value in the foreground image and a second factor.

4. The method of claim 3, wherein updating the background frame comprises, at each corresponding location:

$$B_{n+1}(x,y)=\alpha*B_n(x,y)+(1-\alpha)*F_n(x,y)$$

wherein $B_{n+1}(x,y)$ is a pixel value in the updated background frame at a pixel location (x,y), $B_n(x,y)$ is a pixel value in the background frame at the pixel location (x,y), $F_n(x,y)$ is a pixel value in the foreground frame at the pixel location (x,y), α is the first factor and (1−α) is the second factor.

5. The method of claim 1, wherein updating the background frame comprises, at each corresponding location:

$$B_{n+1}(x,y)=B_n(x,y)-\beta$$

wherein $B_{n+1}(x,y)$ is a pixel value in the updated background frame at a pixel location (x,y), $B_n(x,y)$ is a pixel value in the background frame at the pixel location (x,y), and β is a predetermined factor.

6. A method to identify a moving object in a video, comprising:
   generating a background frame based on a first frame in the video;
   generating a foreground frame based on a second frame in the video, wherein the second frame follows the first frame in the video;
   comparing the foreground frame with the background frame at each corresponding location;
   acquiring an object area including corresponding locations each having a difference greater than a threshold;
   removing shadow from the object area, comprising:
      removing a shadow pixel at a bit location (x,y) from the object area when $$A \le \frac{F_V(x,y)}{B_V(x,y)} \le B$$

and $$C \le \frac{F_n(x,y)}{B_n(x,y)} \le D,$$

wherein $B_V(x,y)$ is a value component representing the background frame at the bit location (x,y) according to an HSV (hue, saturation and value) color space, $F_V(x,y)$ is a value component representing the foreground frame at the bit location (x,y) according to the HSV color space, $B_n(x,y)$ is a grayscale value in the background frame at the bit location (x,y), $F_n(x,y)$ is a grayscale value in the foreground frame at the bit location (x,y), and A, B, C, D are predetermined values ranging between 0 and 1;
   determining, using a processor, whether the object area contains a moving object based on one or more of a size and a shape of the object area;
   responsive to determination that the object area contains a moving object, identifying, using the processor, the moving object;
   updating, using the processor, the background frame according to the difference between the background and the foreground frames at each corresponding location;
   generating an other foreground frame based on a third frame in the video, wherein the third frame follows the second frame in the video; and
   repeating comparing, acquiring, and determining from the updated background frame and the other foreground frame.

7. The method of claim 6, wherein:
   acquiring the object area comprises generating a binary map where a bit is set to a first value when the difference between the background and the foreground frames at a corresponding location exceeds the threshold, and the bit is set to a second value when the difference between the background and the foreground frames at the corresponding location is less than the threshold, wherein the object area comprises the corresponding locations in the foreground frame having the first value in the binary map; and
   the shadow pixel is removed from the object area by setting the shadow pixel to the second value.

8. A method to identify a moving object in a video, comprising:
   generating a background frame based on a first frame in the video;
   generating a foreground frame based on a second frame in the video, wherein the second frame follows the first frame in the video;
   comparing the foreground frame with the background frame at each corresponding location;
   acquiring an object area including corresponding locations each having a difference greater than a threshold;
   determining, using a processor, whether the object area contains a moving object based on one or more of a size and a shape of the object area;
   responsive to determination that the object area contains a moving object, identifying, using the processor, the moving object, wherein identifying the moving object comprises:
      acquiring a first edge map of the object area by applying edge detection to the object area;
      determining a ratio of a length over a width of the edge map; and
      selecting a template of a target object having a ratio similar to the ratio of the object area, the template comprising a second edge map;
   updating, using the processor, the background frame according to the difference between the background and the foreground frames at each corresponding location;
   generating an other foreground frame based on a third frame in the video, wherein the third frame follows the second frame in the video; and
   repeating comparing, acquiring, and determining from the updated background frame and the other foreground frame.

9. The method of claim 8, further comprising:
   acquiring templates of the target object by taking a plurality of photos of the target object at a plurality of angles and applying edge detection to the plurality of photos of the target object.

10. The method of claim 8, wherein identifying the moving object further comprises:
   normalizing the first and the second edge maps.

11. The method of claim 8, wherein identifying the moving object further comprises:
   overlapping the first and the second edge maps at a first position;
   calculating a Hausdorff distance between the first and the second edge maps; and
   determining that the moving object contained in the object area matches the target object when the Hausdorff distance is less than a predetermined distance.

12. The method of claim 11, wherein calculating the Hausdorff distance comprises:
   for M reference points on edges in the second edge map, determining distances to closest target point on edges in the first edge map;
   select n number of the M reference points having smallest distances, wherein n is an integer smaller than M; and setting the Hausdorff distance as a quotient of a sum of the smallest distances and n.

13. The method of claim 12, further comprising:
overlapping the first and the second edge maps in a second position;
determining an other Hausdorff distance between the first and the second edge maps overlapped at the second position;
replacing the Hausdorff distance with the other Hausdorff distance when the other Hausorff distance is less than the Hausdorff distance.

14. The method of claim 13, wherein:
overlapping the first and the second edge maps in the first position comprises overlapping the first and the second edge maps border by border, and
overlapping the first and the second images in the second position comprises moving one of the first and the second edge maps in a predetermined direction for a predetermined distance after overlapping the first and the second edge maps border by border.

15. A method to identify a moving object in a video, comprising:
generating a background frame based on a first frame in the video;
generating a foreground frame based on a second frame in the video, wherein the second frame follows the first frame in the video;
comparing the foreground frame with the background frame at each corresponding location:
acquiring an object area including corresponding locations each having a difference greater than a threshold;
determining, using a processor, whether the object area contains a moving object based on one or more of a size and a shape of the object area;
responsive to determination that the object area contains a moving object, identifying, using the processor, the moving object, wherein identifying the moving object comprises:
acquiring an object edge map of the object area by applying edge detection to the object area;
determining a ratio of a length over a width of the edge map;
selecting templates of target objects having ratios similar to the ratio of the object area, the templates comprising template edge maps;
calculating Hausdorff distances between the object edge map and the template edge maps; and
determining that the moving object contained in the object area matches a target object in a template when its Hausdorff distance is the smallest among the Hausdorff distances of the templates;
updating, using the processor, the background frame according to the difference between the background and the foreground frames at each corresponding location;
generating an other foreground frame based on a third frame in the video, wherein the third frame follows the second frame in the video; and
repeating comparing, acquiring, and determining from the updated background frame and the other foreground frame.

* * * * *

UNITED STATES PATENT AND TRADEMARK OFFICE
CERTIFICATE OF CORRECTION

PATENT NO. : 8,873,801 B2
APPLICATION NO. : 13/380819
DATED : October 28, 2014
INVENTOR(S) : Wang It is certified that error appears in the above-identified patent and that said Letters Patent is hereby corrected as shown below:

On the Title Page

On Page 2, in item (56), under "OTHER PUBLICATIONS", in Column 2, Line 1, delete "Fireground" and insert -- Foreground --, therefor.

On Page 2, in item (56), under "OTHER PUBLICATIONS", in Column 2, Line 5, delete "Provdied" and insert -- Provided --, therefor.

In the Drawings

In Fig. 4, Sheet 4 of 5, in Step "166", delete "communication" and insert -- communications --, therefor.

In Fig. 5, Sheet 5 of 5, delete "uP/uC/DSP" and insert -- $\mu P/\mu C/DSP$ --, therefor.

In Fig. 5, Sheet 5 of 5, in Box "(426)", in Line 3, delete "ALORITHM" and insert -- ALGORITHM --, therefor.

In Fig. 5, Sheet 5 of 5, delete "COMMUNICATION DEVICES (946)" and insert -- COMMUNICATION DEVICES (446) --, therefor.

In the Specification

In Column 1, Line 6, delete "a 371 application" and insert -- a national stage filing under 35 U.S.C. § 371 of application --, therefor.

In Column 3, Line 19, delete "frame F." and insert -- frame $F_n$. --, therefor.

Signed and Sealed this
Nineteenth Day of May, 2015

Michelle K. Lee
*Director of the United States Patent and Trademark Office*

In Column 6, Line 47, delete "computer 16" and insert -- computer system 16 --, therefor.

In Column 10, Line 22, delete "and or" and insert -- and/or --, therefor.

In the Claims

In Column 13, Line 7, in Claim 5, delete "$B_{n+1}(x,y)= B_n(x,y)-\beta$" and insert -- $B_{n+1}(x,y)= B_n(x,y)+\beta$ --, therefor.

In Column 13, Line 45, in Claim 6, delete "$F_V(x,y)$ is a grayscale value" and insert -- $F_n(x,y)$ is a grayscale value --, therefor.

In Column 15, Line 10, in Claim 13, delete "Hausorff" and insert -- Hausdorff --, therefor.

In Column 15, Line 29, in Claim 15, delete "location:" and insert -- location; --, therefor.